US011860993B2

(12) United States Patent
Kumar

(10) Patent No.: US 11,860,993 B2
(45) Date of Patent: Jan. 2, 2024

(54) DYNAMIC RANDOMIZATION OF PASSWORD CHALLENGE

(71) Applicant: STMicroelectronics International N.V., Geneva (CH)

(72) Inventor: Dhulipalla Phaneendra Kumar, Noida (IN)

(73) Assignee: STMicroelectronics International N.V., Geneva (CH)

( * ) Notice: Subject to any disclaimer, the term of this patent is extended or adjusted under 35 U.S.C. 154(b) by 271 days.

(21) Appl. No.: 17/396,137

(22) Filed: Aug. 6, 2021

(65) Prior Publication Data

US 2021/0365545 A1 Nov. 25, 2021

Related U.S. Application Data

(63) Continuation of application No. 16/726,454, filed on Dec. 24, 2019, now Pat. No. 11,227,046.

(51) Int. Cl.
*G06F 21/45* (2013.01)
*G06F 21/31* (2013.01)

(52) U.S. Cl.
CPC .............. *G06F 21/45* (2013.01); *G06F 21/31* (2013.01)

(58) Field of Classification Search
CPC .. G06F 21/45; G06F 21/31; G06F 2221/2123; G06F 2221/2125; G06F 21/755; G06F 21/46; G06F 7/588
See application file for complete search history.

(56) References Cited

U.S. PATENT DOCUMENTS

| | | | |
|---|---|---|---|
| 4,064,558 | A | 12/1977 | Hughes et al. |
| 8,301,912 | B2 | 10/2012 | Lin et al. |
| 8,375,225 | B1 | 2/2013 | Ybarra |
| 8,555,015 | B2 | 10/2013 | Muchsel et al. |
| 8,867,739 | B2 | 10/2014 | Danger |
| 9,152,805 | B2 | 10/2015 | Yamashita |

(Continued)

FOREIGN PATENT DOCUMENTS

EP 3021226 A1 5/2016

OTHER PUBLICATIONS

Atmel: "CryptoCompanion(tm) Chip for CryptoMemory and CryptoRF," AT88SC018, 5277C-CryptoCompanion, Sep. 2009.

(Continued)

*Primary Examiner* — Abiy Getachew
(74) *Attorney, Agent, or Firm* — CROWE & DUNLEVY

(57) ABSTRACT

A method of operating an electronic device includes generating scramble control codes. The scramble codes are generated by generating a random number, shifting the random number to produce a shifted random number, generating control signals by selecting different subsets of the shifted random number, and generating scramble control words by selecting different subsets of the random number based upon the control signals. The method further includes receiving a password comprised of sub-words and scrambling those sub-words according to the scramble control codes, retrieving a verification word comprised of sub-words and scrambling those sub-words according to the scramble control codes, and comparing the scrambled sub-words of the password to the scrambled sub-words of the verification word to thereby authenticate an external device that provided the password.

21 Claims, 6 Drawing Sheets

(56) References Cited

U.S. PATENT DOCUMENTS

| | | | | |
|---|---|---|---|---|
| 9,600,678 | B1 | 3/2017 | Alamuri et al. | |
| 9,614,837 | B2 | 4/2017 | Archer et al. | |
| 10,540,492 | B1* | 1/2020 | Norris, III | G06F 21/36 |
| 2003/0172029 | A1 | 9/2003 | Moitrel et al. | |
| 2003/0229598 | A1 | 12/2003 | de Jong | |
| 2007/0299894 | A1 | 12/2007 | Muraoka | |
| 2009/0228977 | A1* | 9/2009 | Lee | G06F 21/46 726/18 |
| 2009/0241201 | A1 | 9/2009 | Wootton et al. | |
| 2013/0262880 | A1 | 10/2013 | Pong et al. | |
| 2014/0359734 | A1* | 12/2014 | Natividad | H04L 9/3226 726/6 |
| 2016/0140356 | A1 | 5/2016 | Tasher et al. | |
| 2016/0283744 | A1* | 9/2016 | Dawson | G06F 16/22 |

OTHER PUBLICATIONS

Waksman, Adam, et al: "Silencing Hardware Backdoors," May 22, 2011, 15 pages.

Microchip SAM L10/L11 Family, "Ultra Low-Power, 32-bit Cortex-M23 MCUs with TrustZone, Crypto, and Enhanced PTC," 2019 Microchip technology Inc., Datasheet, 1222 pages.

EPO Search Report and Written Opinion for co-pending EP Appl. No. 20214436.6 dated May 6, 2021 (5 pages).

* cited by examiner

DYNAMIC RANDOMIZATION OF PASSWORD CHALLENGE

RELATED APPLICATION

This application is a continuation of U.S. patent application Ser. No. 16/726,454, filed Dec. 24, 2019, the contents of which are incorporated by reference.

TECHNICAL FIELD

This application is directed to the field of security applications and, in particular, to a technique for the dynamic randomization of password challenges across chips so as to reduce the possibility of malicious hacks.

BACKGROUND

Shown in FIGS. 1A-2B are process flow diagrams illustrating the susceptibility of a typical password challenge by an embedded system 5, such as a system on a chip, to a hack performed by a malicious user 25.

Beginning with FIG. 1A, an authorized user 11 requests access to the embedded system 5 via a tool 13 associated with the authorized user 11. At this time, the embedded system 5 initiates a password challenge process by an IO interface 14 of the embedded system 5 receiving a password 12 from the tool 13. The IO interface 14 passes the password 12 to a challenge verifier 15. The challenge verifier 15 retrieves a verification word 17 from a password store 16, and compares the password 12 to the verification word 17. If the password 12 matches the verification word 17, the challenge verifier 15 generates an unlock command 18 which unlocks access to a secure resource 20. At this point, the authorized user 11 has been granted access to the secure resource 20, and may read secure data 21 from and/or write secure data 21 to the secure resource 20. Note that the password 12 provided by the tool 13 changes at each power on reset, as does the verification word 17. Also note that the mechanism used to generate the password 12 and verification word 17 remains the same at each power on reset, and remains the same across different ones of the same model of embedded system 5.

The concern with this process flow is that a malicious user 25 may measure signal pulses or spikes 27 that occur during this password challenge process shown in FIG. 1A and, in particular, may measure this over a range of multiple different embedded systems 5 to determine a single or series of pulses or spikes that can be considered to be a reference measurement 28. Then, as shown in FIG. 1B, the malicious user 25 may program a tool 13' to try a series of different passwords 12', while the malicious user 25 measures the resulting signal pulses or spikes 29 that occur. When the measured signal pulses or spikes 29 match the reference measurement 28, then the tool 13' will routinely generate a password 12' that passes the password challenge at each power on reset. At this point, the embedded system 5 is compromised.

Shown in FIG. 1C is a block diagram of the challenge verifier 15. Here, it can be seen that the password 12 received from the tool 13 is stored in a password register 40 in the challenger verifier block 15. The verification word 17 retrieved from the password store 16 is stored in a verifier register 41 in the challenger verifier block 15. A comparison circuit 42 compares the password 12 to the verification word 17 and unlocks access to the secure resource 20 if there is a match. Note here that both the password 12 and verification word 17 are 256 bits, and that the comparison circuit 42 performs a 256 bit compare. Therefore, a single pulse or spike (or single pattern of pulses or spikes) is generated by the 256 bit compare.

A block diagram of a variant of the challenger verifier block 15' is shown in FIG. 1D. Here, while the password 12 and verification word 17 are 256 bit, the compare performed is a 64 bit compare, multiple times. Therefore, a 256-to-64 multiplexer 43 passes 64 bits of the password 12 from the password register 40 to the comparison circuit 42 at a time (under control of a two bit selection signal Sel[1:0]), while a 256-to-64 multiplexer 44 passes 64 bits of the verification word 17 from the verifier register 41 to the comparison circuit 42 at a time (also under control of Sel[1:0]), so that individual 64 bit compares can be performed, with the comparison circuit 42 unlocking the access to the secure resource 20 if there is a match at each 64 bit compare. Therefore, compared to the single pulse or spike (or single pattern of pulses or spikes) generated when a 256 bit compare is performed (FIG. 1C), four pulses or spikes (or four patterns of pulses or spikes) are here generated by the four 64 bit compares.

A block diagram of a variant of the challenger verifier block 15" is shown in FIG. 1E. Here, while the password 12 and verification word 17 are 256 bit, the compare performed is a 32 bit compare, multiple times. Therefore, a 256-to-32 multiplexer 43 passes 32 bits of the password 12 from the password register 40 to the comparison circuit 42 at a time (under control of a three bit selection signal Sel[2:0]), while a 256-to-32 multiplexer 44 passes 32 bits of the verification word 17 from the verifier register 41 to the comparison circuit 42 at a time (also under control of Sel[2:0]), so that individual 32 bit compares can be performed, with the comparison circuit 42 unlocking the access to the secure resource 20 is there is a match at each 32 bit compare. Therefore, compared to the single pulse or spike (or single pattern of pulses or spikes) generated when a 256 bit compare is performed (FIG. 1C), eight pulses or spikes (or eight patterns of pulses or spikes) are here generated by the eight 32 bit compares.

While this use the process for multiple 64 or 32 bit compares may complicate the measuring to be performed by the malicious user 25, the mechanism used to generate the password 12 and verification word 17 remains the same at each power on reset, and remains the same across different ones of the same model of embedded system 5, meaning that the malicious user 25 may still be able to successfully accomplish a hack.

Therefore, further development into password challenge process flows for embedded systems is required.

SUMMARY

Disclosed herein is a method of operating an electronic device. The method includes generating scramble control codes by: generating a random number; shifting the random number to produce a shifted random number; generating control signals by selecting different subsets of the shifted random number; and generating scramble control words by selecting different subsets of the random number based upon the control signals. The method further includes: receiving a password comprised of sub-words, and scrambling those sub-words according to the scramble control codes; retrieving a verification word comprised of sub-words, and scrambling those sub-words according to the scramble control codes; and comparing the scrambled sub-words of the password to the scrambled sub-words of the verification word to thereby authenticate an external device that provided the password.

The control signals may be generated by selecting first, second, and third subsets of the shifted random number to produce first, second, and third control signals. The scramble control words may be generated by selecting first, second, and third subsets of the random number based upon the first, second, and third control signals to produce first, second, and third scramble control codes.

The first scramble control codes may determine a compare order, and the compare order may determine an order in which the scrambled sub-words of the password and the scrambled sub-words of the verification word are compared.

The second scramble control code may determine a number of cycles between comparisons, and the number of cycles between comparisons determines a number of clock cycles between performances of each comparison of a scrambled sub-word of the password to a scrambled sub-word of the verification word.

The third scramble control code may determine a dummy compare, and the dummy compare may cause a dummy comparison between a sub-word of the password and a sub-word of the verification word.

The shifting of the random number may be performed by performing a circular shift.

The random number may be generated in response to occurrence of a given event.

The given event may be a power on reset of the electronic device.

The given event may be a hard reset of the electronic device.

The generation of the random number may be performed using a true random number generator.

The generation of the random number may be performed using a pseudo random number generator.

Also disclosed herein is a system for performing a password challenge. The system includes a code randomizer configured to: generate a random number; shift the random number to produce a shifted random number; generate control signals by selecting different subsets of the shifted random number; and generate scramble control codes by selecting different subsets of the random number based upon the control signals. The system also includes an input/output interface configured to receive a password, the password being comprised of sub-words. The system further includes a challenge scrambler configured to receive the password from the input/output interface, receive the scramble control codes, and re-order the sub-words of the password based upon the scramble control codes. The system also incudes a challenge verifier configured to: retrieve a verification word from a password store, the verification word being comprised of sub-words; compare the sub-words of the password to the sub-words of the verification word; and if each sub-word of the password matches each corresponding sub-word of the verification word, generate an unlock command. The system further includes a secure resource configured to grant access to data stored therein in response to receipt of the unlock command.

The code randomizer may generate the control signals by generated by selecting first, second, and third subsets of the shifted random number to produce first, second, and third control signals.

The code randomizer may generate the scramble control codes by selecting first, second, and third subsets of the random number based upon the first, second, and third control signals to produce first, second, and third scramble control codes.

The challenge scrambler may reorder the sub-words of the password based upon the first scramble control code.

The challenge verifier may reorder the sub-words of the verification word based upon the first scramble control code.

The challenge verifier may be further configured to insert a delay between at least one comparison of a given sub-word of the password to a corresponding sub-word of the verification word based upon the second scramble control code.

The challenge verifier may be further configured to perform a dummy comparison of a given sub-word of the password to a corresponding sub-word of the verification word based on the third scramble control code.

The code randomizer may include: a shift register configured to shift the random number to produce the shifted random number; a first multiplexer having a selection input coupled to receive the first control signal, a data input coupled to receive the random number, and an output producing the first scramble control code in response to the first control signal; a second multiplexer having a selection input coupled to receive the second control signal, a data input coupled to receive the random number, and an output producing the second scramble code in response to the second control signal; and a third multiplexer having a selection input coupled to receive the third control signal, a data input coupled to receive the random number, and an output producing the third scramble code in response to the third control signal.

A random number generator may be configured to generate the random number.

The random number generator may be a pseudo random number generator.

The random number generator may be comprise a true random number generator.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Figure 1A:
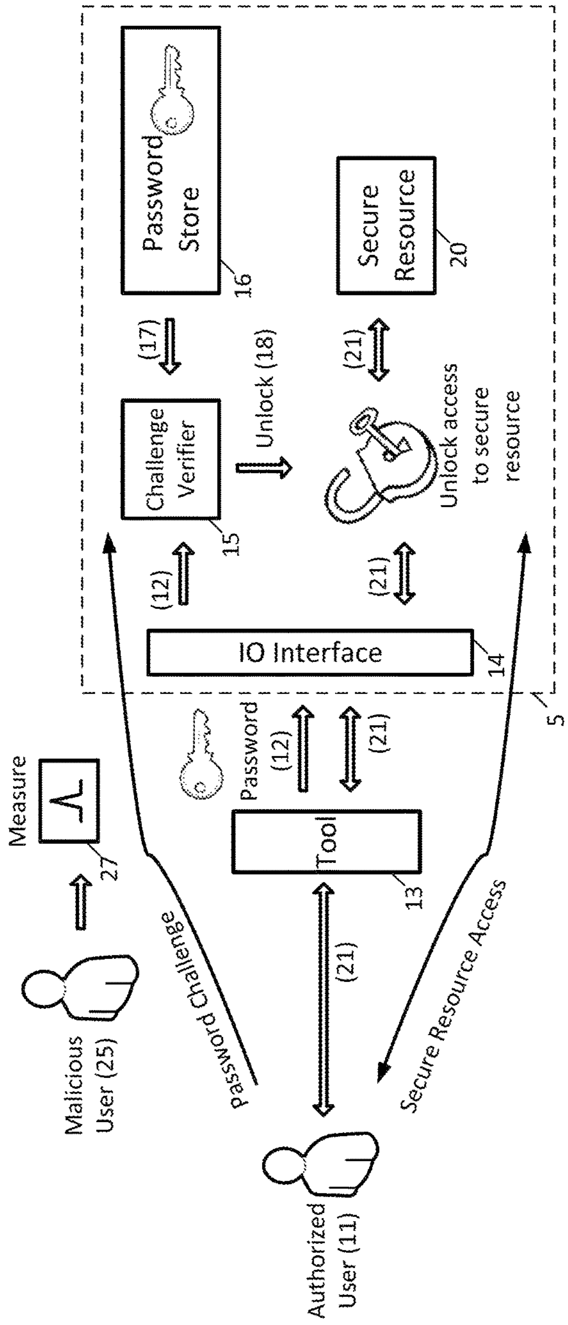
FIG. 1A is a process flow diagram of a prior art password challenge technique implemented by a prior art embedded system, in which an authorized user is accessing the embedded system while a malicious user measures the embedded system.
Figure 1B:
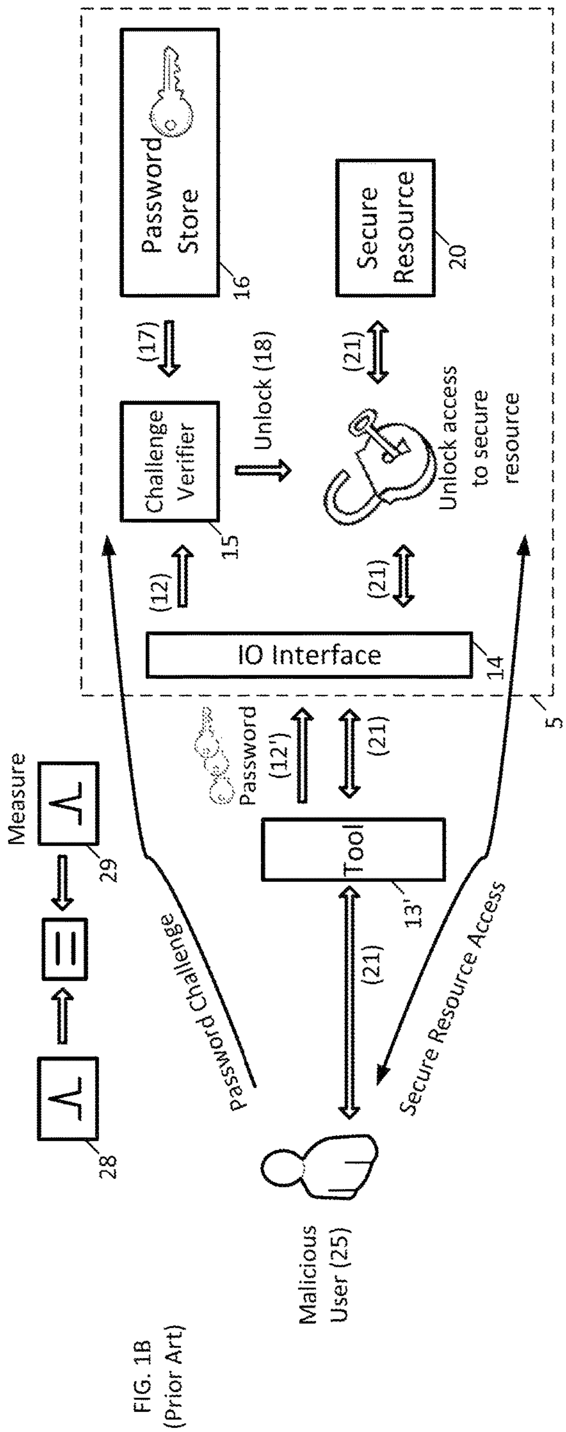
FIG. 1B is a process flow diagram of the prior art password challenge technique of FIG. 1A, in which the malicious user utilizes the measurements taken of use of the authorized user to be able to program a malicious tool to be able to pass the password challenge.
Figure 1C:
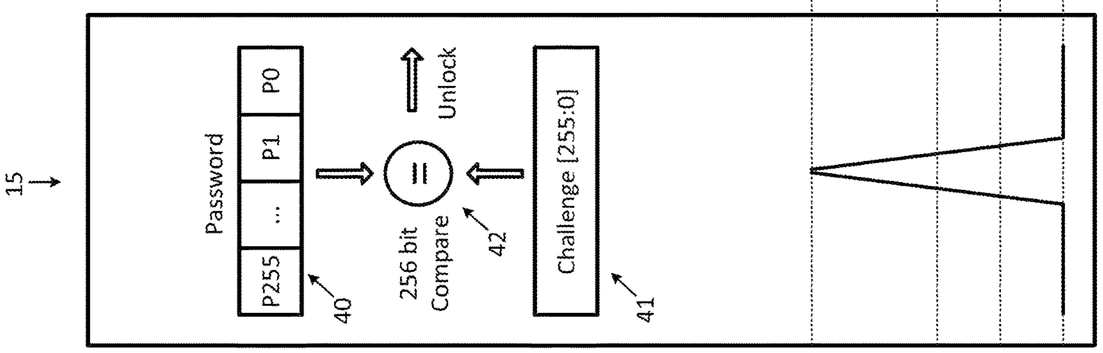
FIG. 1C is a block diagram of the challenge verifier of FIGS. 1A-1B, configured to use a 256 bit compare to complete the password challenge.
Figure 1D:
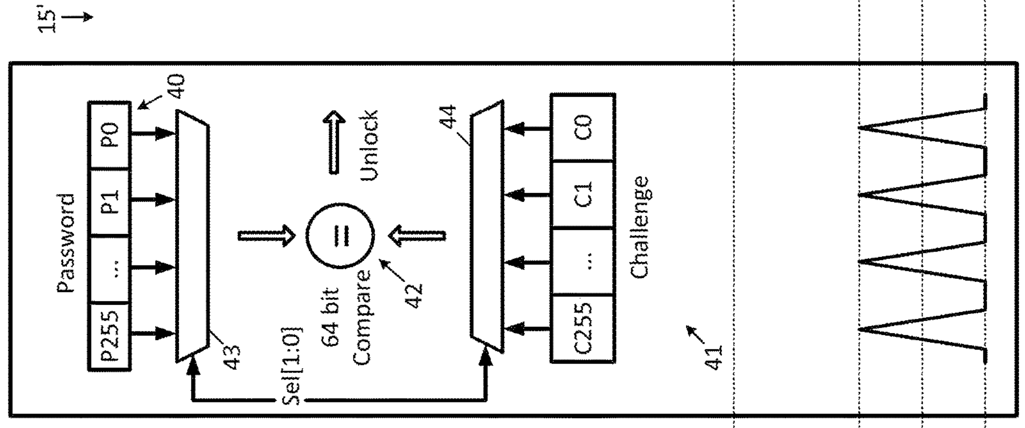
FIG. 1D is a block diagram of the challenge verifier of FIGS. 1A-1B, configured to use a 64 bit compare to complete the password challenge.
Figure 1E:
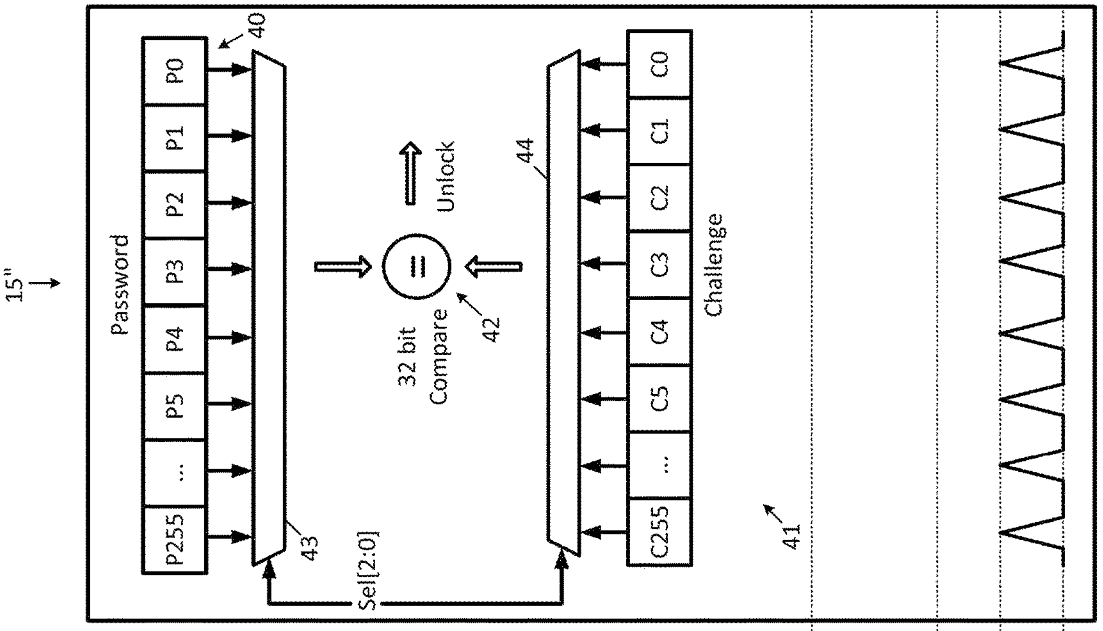
FIG. 1E is a block diagram of the challenge verifier of FIGS. 1A-1B, configured to use a 32 bit compare to complete the password challenge.
Figure 2:
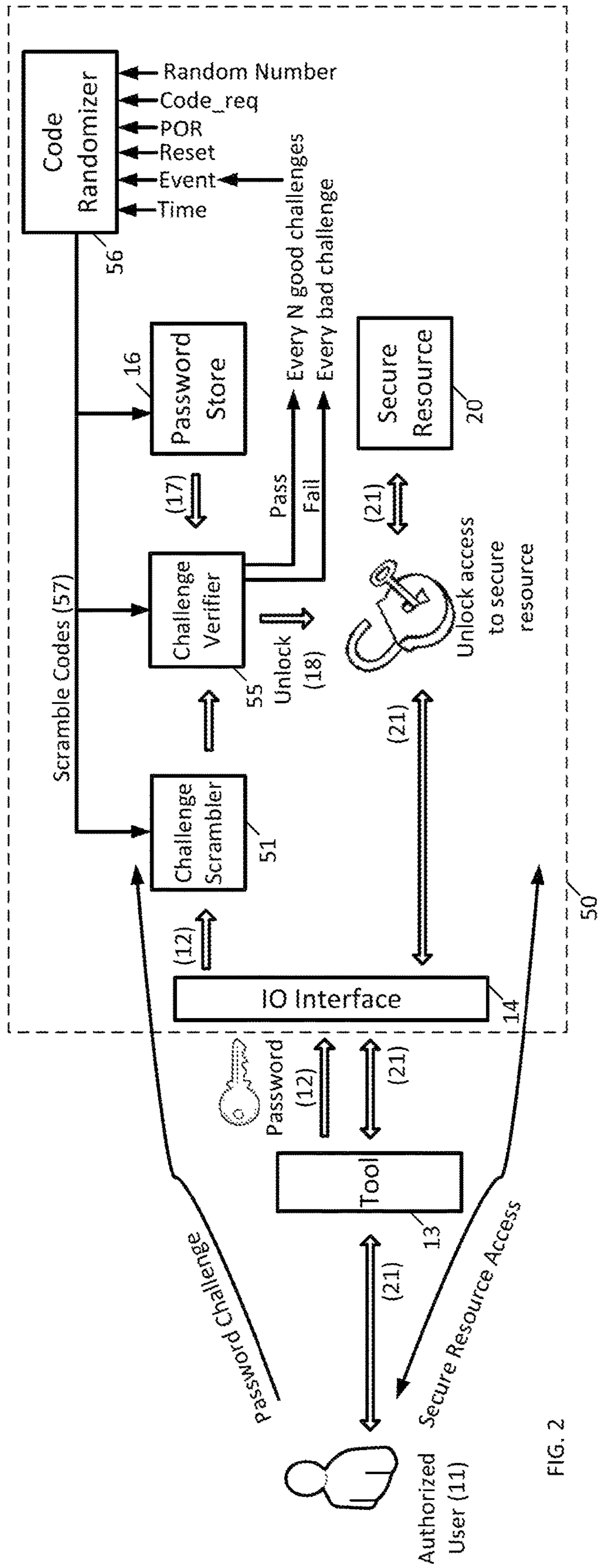
FIG. 2 is a process flow diagram of a password challenge technique implemented by an embedded system described herein, in which both the password and verification word are dynamically randomized.

Shown in FIG. 2 is a process flow diagram illustrating a password challenge by an embedded system 50 disclosed herein, such as a system on a chip.

An authorized user 11 requests access to the embedded system 50 via a tool 13 associated with the authorized user 11. At this time, the embedded system 50 initiates a password challenge process by an IO interface 14 of the embedded system 50 receiving a password 12 from the tool 13, or by the IO interface 14 sending a password request to the tool 13.

The IO interface 14 passes the password 12 through a challenge scrambler 51 to a challenge verifier block 55. The challenge scrambler 51 acts upon the password 12 according to the scramble codes 57 received from a code randomizer 56. The challenge verifier 55 receives a verification word 17 from a password store 16, and acts upon the verification word 17 according to the scramble codes 57. The challenge verifier 55 compares the password 12 as acted upon by the challenge scrambler 51 to the verification word 17 as acted upon by the challenge verifier 55, and generates an unlock command 18 which unlocks access to a secure resource 20 if a match is found. At this point, the authorized user 11 is allowed to access information from, and/or write information to, the secure resource 20.

The password 12 and verification word 17 each have a same number of bits, such as 256 (but may be longer or shorter), divided into sub-words (that collectively comprise the respective password or verification word). The sub-words are, for example, 64 bit (but may be longer or shorter). When performing a comparison between the password 12 and verification word 17, as explained, the challenge verifier 55 compares sub-words of the password 12 to corresponding sub-words of the verification word 17, and generates an unlock command 18 which unlocks access to a secure resource 20 if each sub-word matches.

The scramble codes 57 inform the challenge scrambler 51 and challenge verifier 55 how to randomize the order of the sub-words of the password 12 and verification word 17. The scramble codes also inform the challenge verifier how to randomize the time delay (i.e. how many cycles to insert) between subsequent sub-word comparisons and how to randomize the insertion of dummy compares (such as dummy false positive comparisons) into the password challenge.

Figure 3A:
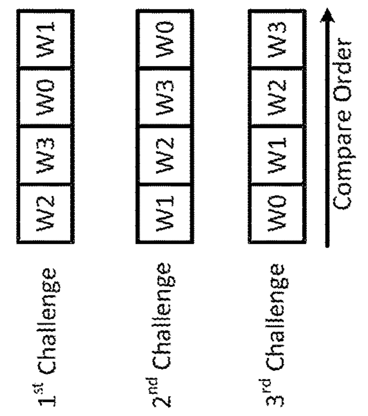
FIG. 3A is a diagram of 256 bit verification words of FIG. 2 divided into 64 bit sub-words, after a dynamic randomization of the order in which the 64 bit sub-words of the password and verification word are compared.

These actions are now described in detail. FIG. 3A is a diagram showing how, with each password challenge iteration, the order of sub-word comparison is randomized. For example, assume that the password 12 and verification word 17 are each comprised of four sub-words W0-W4. During a first password challenge iteration, the challenge scrambler 51, pursuant to the scramble codes 57, rearranges the order of the sub-words of the password 12 to be W2, W3, W0, W1. Likewise, the challenge verifier 55, also pursuant to the scramble codes 57, rearranges the order of the sub-words of the verification word 17 to be W2, W3, W0, W1.

Figure 3B:
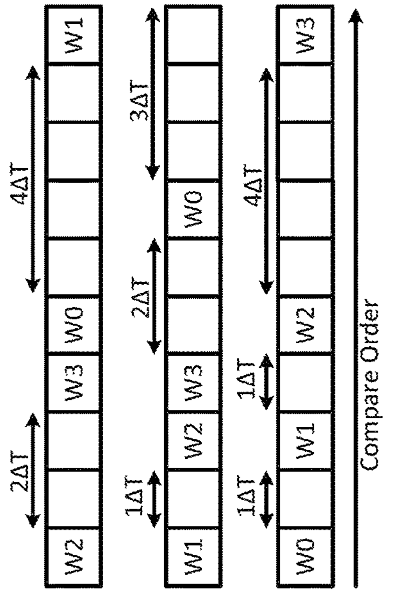
FIG. 3B is a diagram of the verification words of FIG. 3A, after a dynamic randomization of the time between the comparison of 64 bit sub-words of the password and verification word.

FIG. 3B is a diagram showing how, with each password challenge iteration, the time delay between subsequent word comparisons is randomized. Here, for example, during a first password challenge iteration, the challenge verifier 55, pursuant to the scramble codes 57: inserts a delay of 2ΔT between the comparison of W2 of the password 12 to W2 of the verification word 17, and the comparison of W3 of the password 12 to W3 of the verification word 17; does not insert a delay between the comparison of W3 of the password 12 to W3 of the verification word 17, and the comparison of W0 of the password 12 to W0 of the verification word 17; and inserts a delay of 4ΔT between the comparison of W0 of the password 12 to W0 of the verification word 17, and the comparison of W1 of the password 12 to W1 of the verification word 17.

Figure 3C:
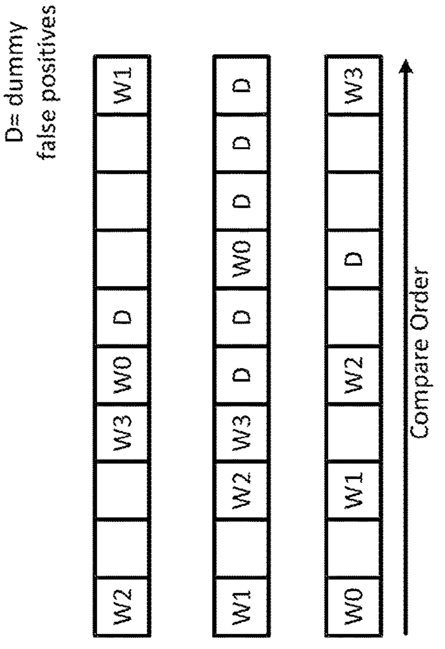
FIG. 3C is a diagram of the verification words of FIG. 3B after the insertion of dummy compare operations.

FIG. 3C is a diagram showing how, with each password challenge iteration, dummy comparisons (potentially false positive comparisons) are randomly inserted between compares of the sub-words of the password 12 to the verification word 17. Here, for example, during a first password challenge iteration, the challenge verifier 55, pursuant to the scramble codes 57, inserts a dummy comparison immediately after the comparison of W0 of the password 12 to W0 of the verification word 17.

Figure 4:
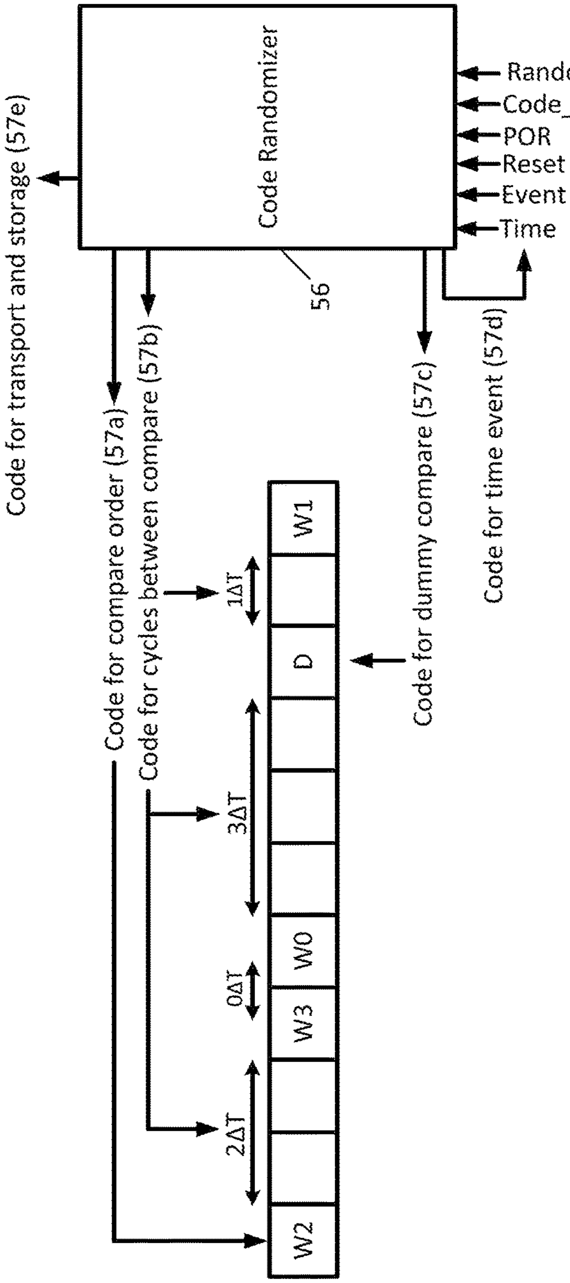
FIG. 4 is a diagram showing how the scramble codes of the code randomizer of FIG. 2 inform the challenge verifier how to perform the dynamic randomization of verification words shown in FIGS. 3B-3C.

Shown in FIG. 4 is how the scramble codes 57 generated by the code randomizer 57 include a code for compare order 57*a* (informing the challenge scrambler 51 and challenge verifier 55 in what order to re-order the sub-words of the password 12 and verification word 17), a code for cycles between compare 57*b* (informing the challenge verifier 55 between which sub-word comparisons to insert delays, and how long those delays should be), a code for dummy compare 57*c* (informing the challenge verifier 55 between which sub-word comparisons to insert dummy comparisons), and optionally a code for a time event 57*d* that informs the code randomizer 56 itself when to generate new scramble codes 57. The time event may be periodic. The scramble codes are generated based upon a random number received by the code randomizer 56. The random number itself may be re-generated (to yield a new random number) at each power on reset, and/or when a given event occurs, and/or when a hard reset occurs, and/or when a power-up occurs, and/or in response to the code for the time event 57*d*, and/or at each password challenge.

Note that the code randomizer 56 generates new scramble codes 57 at each power on reset, and/or when a given event occurs (such as any operation performed on the password store 16), and/or when a hard reset occurs, and/or when a power-up occurs, and/or in response to the code for the time event 57*d*, and/or at each password challenge. The event may also be upon every failed comparison (lack of a match) between the password 12 and the verification word 17, or may be upon every N successful comparisons (match occurred) between different passwords 12 and corresponding verification words 17, for example.

The code randomizer 56 may receive a control signal Code_req that informs the code randomizer 56 which scramble codes 57 to generate (for example 57*a*-57*c* but not 57*d*).

Referring back to FIGS. 3A-3B, it can be seen that the randomization is not only within each password challenge, but across password challenges when new scramble codes 57 are generated.

Therefore, for example, at a second challenge, the order of word comparison between the password 12 and the verification word 17 is W1, W2, W3, W0; a delay of 1ΔT is inserted between the comparisons of W1 and W2 while a delay of 2ΔT is inserted between the comparisons of W3 and W0, and a delay of 3ΔT is inserted after the comparisons of W0; two dummy comparisons are inserted between the comparisons of W3 and W0, and three dummy comparisons are inserted after the comparisons of W0.

At a third challenge, the order of word comparison between the password 12 and the verification word 17 is W0, W1, W2, W3; a delay of 1ΔT is inserted between the comparisons of W0 and W1, a delay of 1ΔT is inserted between the comparisons of W1 and W2, and a delay of 4ΔT is inserted between the comparisons of W2 and W3; and a dummy comparison is inserted after a delay of 1ΔT after the comparison of W2.

Figure 5A:
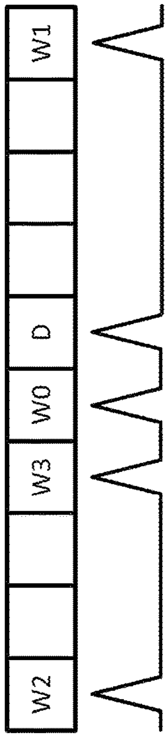
FIGS. 5A-5C illustrate how measurement of the password challenge pursuant to the process flow diagram of FIG. 2 yields a different pattern each time, reducing possibility of a hack.
Figure 5B:
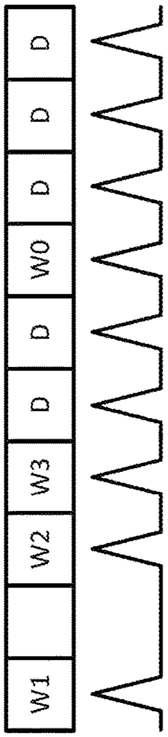
Figure 5C:
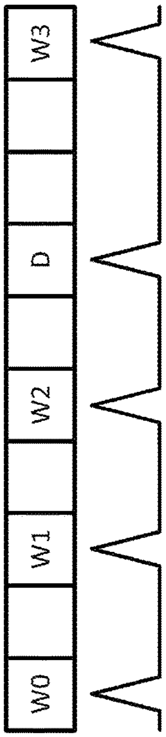

The effect of this randomization within each password challenge, and across password challenges, can be seen in FIGS. 5A-5B, where measuring signal pulses or spikes yields a different result for each password challenge. Still further, it should be appreciated that since the scramble codes 57 are generated based upon a random number, this randomization is actually not only within each password challenge and across password challenges, but also across embedded systems 50. This means that measurement of a single embedded system 50 will not yield useful information to a malicious user, but also that measurement of multiple such embedded systems 50 will not yield useful information to a malicious user. Therefore, implementation of the password challenge process flow described above improves the functionality of the embedded device 50 by providing the embedded device 50 with additional protection against hacking.

Figure 6:
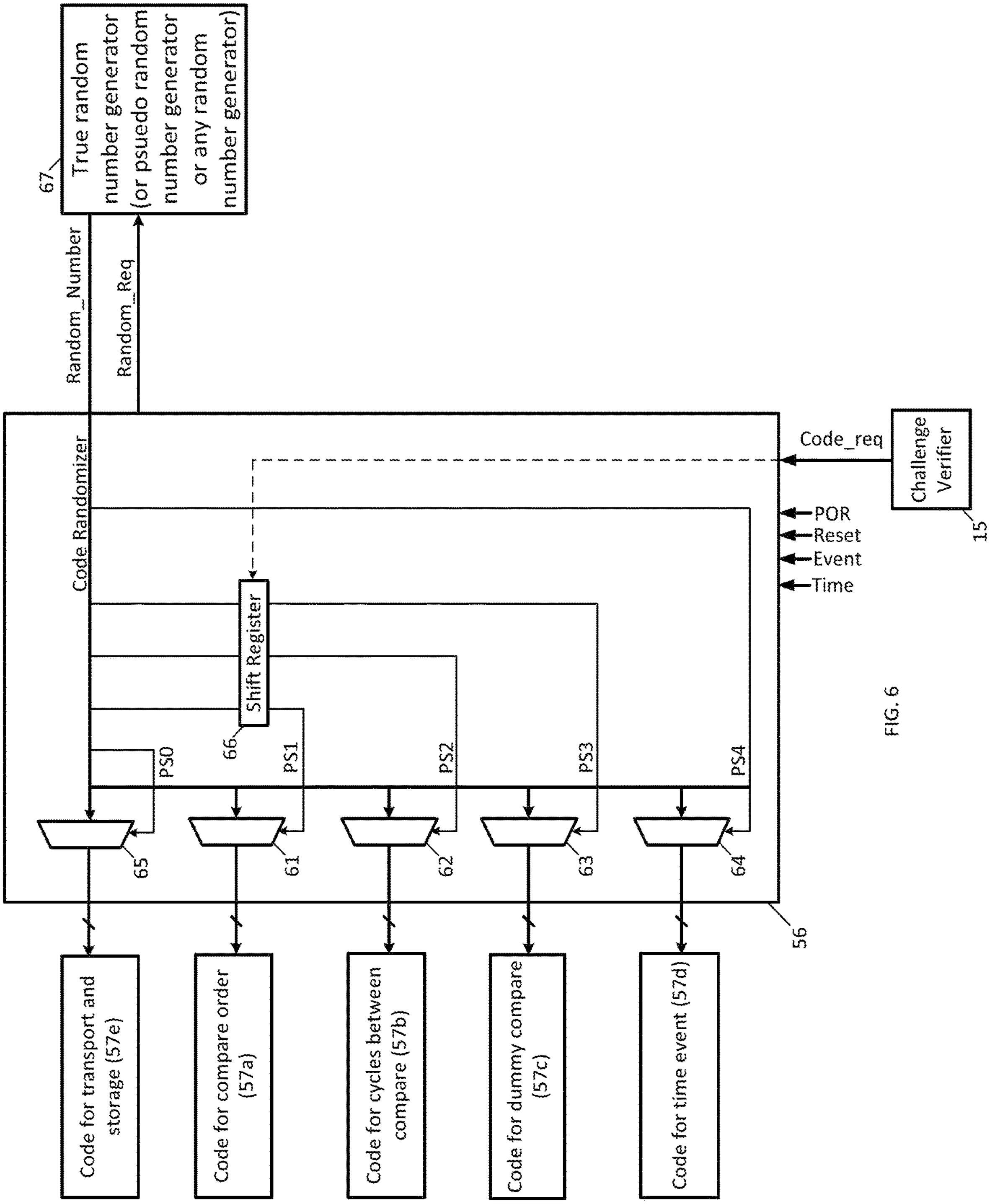
FIG. 6 is a block diagram of the code randomizer of FIG. 2.

Further details of the generation of the scramble codes 57 by the code randomizer 56 can be seen in FIG. 6. A digital random number Random_Number is received by the code randomizer 56 from a random number generator 67 (which may also be a true random number generator, or a pseudo random number generator, or any random number generator) in response to the code randomizer 56 outputting the random number required signal Random_Req to the random number generator 67. The code randomizer 56 generates the random number required signal Random_Req in response to a power on reset (POR), a hard reset (power on), occurrence of a specific event (such as performance of any operation on the password store 16, or upon every failed comparison between the password 12 and the verification word 17, or upon every N successful comparisons between different passwords 12 and corresponding verification words 17, or may be upon every comparison regardless of output, for example), or at a specific time (such as periodically or aperiodically during operation), or in response to the code required signal Code_req explained above.

The full digital random number is fed to multiplexers 61-65. The multiplexers 61-65 are respectively switched by individual bits or groups of bits PS0-PS4 of the digital random word Random_Number to select different bit groups of the digital random number Random_Number to pass as the scramble codes 57*a*-57*e*. Note that the digital random number Random_Number is a multi-bit number and that the multiplexers 61-65 each output 57*a*-57*e* as multi-bit numbers. Note that a shift register 66 receives the digital random number Random_Number and from it, generates PS1-PS3. Note that the bits PS1-PS3 may be re-selected by the shift register 66 between different generations of the digital random number, in response to receipt of the Code_req signal.

Figure 7:
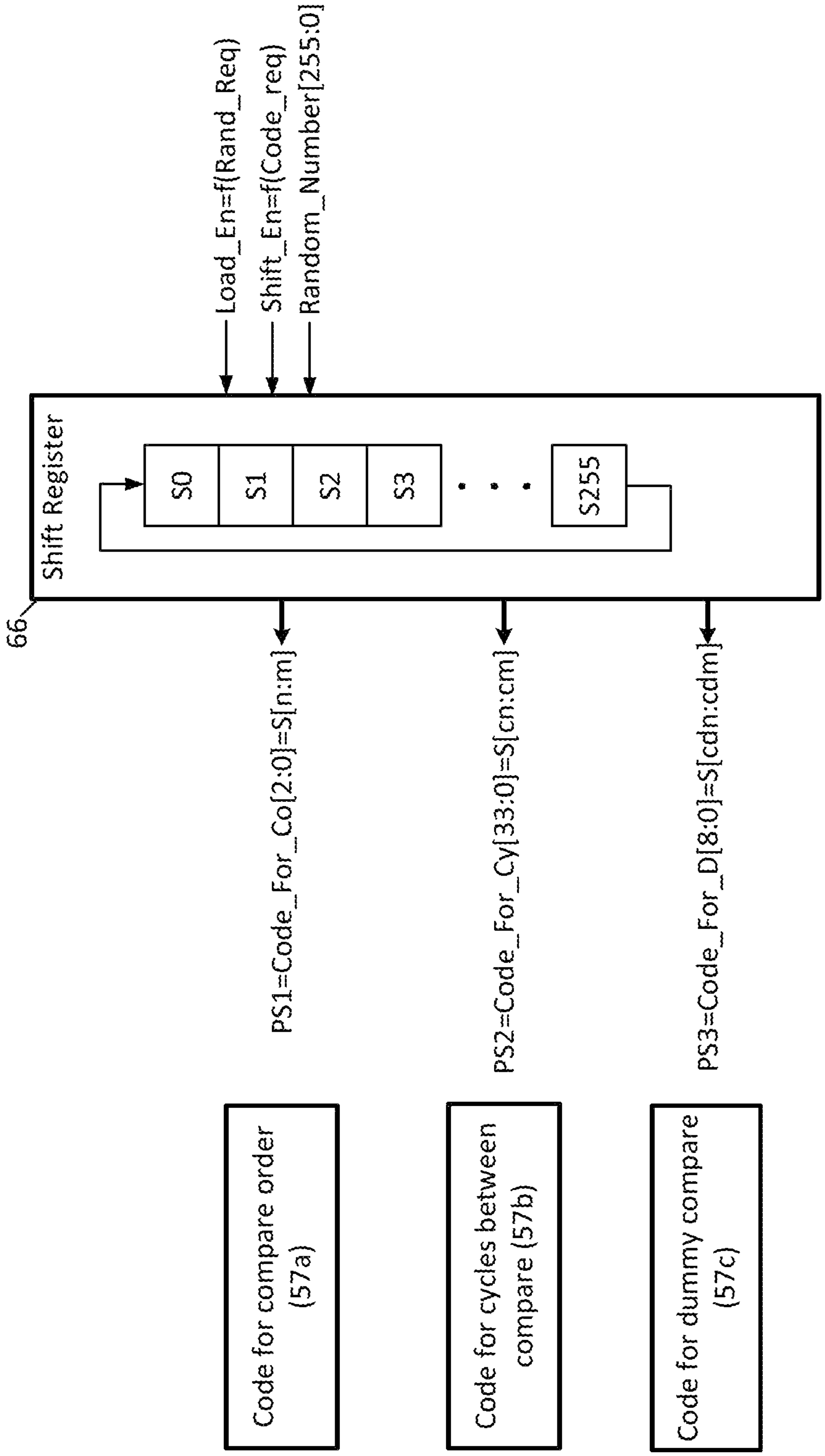
FIG. 7 is a block diagram of the shift register of the code randomizer of FIG. 6.

Further details of the shift register 66 may be found in FIG. 7. As can be seen, the shift register 66 interprets the Random_Req signal as a load enable signal (meaning that the shift register is re-loaded with the current digital random number Random_Number, which here is a 256 bit number). The shift register 66 also interprets the Code_req signal as a shift enable signal Shift_En, meaning that the shift register 66 performs a shift of the random number by a given amount, with the shift being a circular shift such that the bits that would be shifted out of the shift register 66 are instead shifted back into the beginning of the shift register 66. For example, if bit 255 (referred to as S255) is shifted, it will be shifted around to be bit 0 (referred to as S0).

This shift register 66 generates PS1, which is a 3 bit code for causing the multiplexer 61 to select the proper bits of the digital random number Random_Number, referred to here at Code_For_Co[2:0], for generating the code for compare order 57*a*. As such, PS1 here is equal to S[n:m], with S[255:0] representing the digital random number Random_Number.

The shift register 66 also generates PS2, which is a 34 bit code for selecting the proper bits of the digital random number Random_Number, referred to here at Code_For_Cy [33:0], for generating the code for cycles between compare 57*b*. As such, PS2 here is equal to S[cn:cm].

The shift register 66 also generates PS3, which is a 9 bit code for selecting the proper bits of the digital random number Random_Number, referred to here at Code_For_D [33:0], for generating the code for inserting dummy compares 57*c*. As such, PS3 here is equal to S[cdn:cdm].

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A method of operating an electronic device, comprising:

generating scramble control codes by:

generating a random number;

shifting the random number to produce a shifted random number;

generating control signals by selecting different subsets of the shifted random number; and generating scramble control words by selecting different subsets of the random number based upon the control signals;

receiving a password comprised of sub-words;

scrambling the sub-words of the password according to the scramble control codes;

retrieving a verification word comprised of sub-words, and scrambling the sub-words of the verification word according to the scramble control codes; and comparing the scrambled sub-words of the password to the scrambled sub-words of the verification word to thereby authenticate an external device that provided the password.

2. The method of claim 1, wherein the control signals are generated by selecting first, second, and third subsets of the shifted random number to produce first, second, and third control signals; and wherein the scramble control words are generated by selecting first, second, and third subsets of the random number based upon the first, second, and third control signals to produce first, second, and third scramble control codes.

3. The method of claim 2, wherein the first scramble control code determines a compare order; and wherein the compare order determines an order in which the scrambled sub-words of the password and the scrambled sub-words of the verification word are compared.

4. The method of claim 3, wherein the second scramble control code determines a number of cycles between comparisons; and wherein the number of cycles between comparisons determines a number of clock cycles between performance of each comparison of a scrambled sub-word of the password to a scrambled sub-word of the verification word.

5. The method of claim 4, wherein the third scramble control code determines a dummy compare; and wherein the dummy compare causes a dummy comparison between a sub-word of the password and a sub-word of the verification word.

6. The method of claim 1, wherein the shifting of the random number comprises performing a circular shift on the random number to produce the shifted random number.

7. The method of claim 1, wherein the random number is generated in response to occurrence of a given event.

8. The method of claim 7, wherein the given event comprises a power on reset of the electronic device.

9. The method of claim 7, wherein the given event comprises a hard reset of the electronic device.

10. The method of claim 1, wherein the generation of the random number is performed using a true random number generator.

11. The method of claim 1, wherein the generation of the random number is performed using a pseudo random number generator.

12. A system for performing a password challenge, comprising:

a code randomizer configured to:

receive a random number;

shift the random number to produce a shifted random number;

generate control signals by selecting different subsets of the shifted random number; and generate scramble control codes by selecting different subsets of the random number based upon the control signals;

an input/output interface configured to receive a password, the password being comprised of sub-words;

a challenge scrambler configured to receive the password from the input/output interface, receive the scramble control codes, and re-order the sub-words of the password based upon the scramble control codes;

a challenge verifier configured to:

retrieve a verification word from a password store, the verification word being comprised of sub-words;

compare the sub-words of the password to the sub-words of the verification word; and if each sub-word of the password matches each corresponding sub-word of the verification word, generate an unlock command; and a secure resource configured to grant access to data stored therein in response to receipt of the unlock command.

13. The system of claim 12, wherein the code randomizer generates the control signals by generated by selecting first, second, and third subsets of the shifted random number to produce first, second, and third control signals; and wherein the code randomizer generates the scramble control codes by selecting first, second, and third subsets of the random number based upon the first, second, and third control signals to produce first, second, and third scramble control codes.

14. The system of claim 13, wherein the challenge scrambler reorders the sub-words of the password based upon the first scramble control code.

15. The system of claim 14, wherein the challenge verifier reorders the sub-words of the verification word based upon the first scramble control code.

16. The system of claim 15, wherein the challenge verifier is further configured to insert a delay between at least one comparison of a given sub-word of the password to a corresponding sub-word of the verification word based upon the second scramble control code.

17. The system of claim 16, wherein the challenge verifier is further configured to perform a dummy comparison of a given sub-word of the password to a corresponding sub-word of the verification word based on the third scramble control code.

18. The system of claim 13, wherein the code randomizer comprises:

a shift register configured to shift the random number to produce the shifted random number;

a first multiplexer having a selection input coupled to receive the first control signal, a data input coupled to receive the random number, and an output producing the first scramble control code in response to the first control signal;

a second multiplexer having a selection input coupled to receive the second control signal, a data input coupled to receive the random number, and an output producing the second scramble code in response to the second control signal; and a third multiplexer having a selection input coupled to receive the third control signal, a data input coupled to receive the random number, and an output producing the third scramble code in response to the third control signal.

19. The system of claim 12, further comprising a random number generator configured to generate the random number.

20. The system of claim 19, wherein the random number generator comprises a pseudo random number generator.

21. The system of claim 19, wherein the random number generator comprises a true random number generator.

* * * * *